United States Patent
Vadella et al.

(10) Patent No.: US 8,024,745 B2
(45) Date of Patent: Sep. 20, 2011

(54) COMMUNICATION MECHANISM BETWEEN DISCONNECTED APPLICATIONS IN A WEB BROWSER

(75) Inventors: Kenneth Alexander Vadella, West Bloomfield, MI (US); J. Daniel Smith, Whitmore Lake, MI (US); Dennis M. Mulonas, Jr., Royal Oak, MI (US)

(73) Assignee: Autodesk, Inc., San Rafael, CA (US)

( * ) Notice: Subject to any disclaimer, the term of this patent is extended or adjusted under 35 U.S.C. 154(b) by 1828 days.

(21) Appl. No.: 10/607,119

(22) Filed: Jun. 26, 2003

(65) Prior Publication Data

US 2004/0216124 A1    Oct. 28, 2004

Related U.S. Application Data

(60) Provisional application No. 60/392,348, filed on Jun. 28, 2002.

(51) Int. Cl.
*G06F 9/44* (2006.01)
*G06F 17/00* (2006.01)

(52) U.S. Cl. .................. 719/328; 715/234; 719/313

(58) Field of Classification Search .......... 709/201–207, 709/217–219; 715/733, 734, 738, 751, 752, 715/234; 717/120, 121; 719/311, 328, 329, 719/313; 707/1–10
See application file for complete search history.

(56) References Cited

U.S. PATENT DOCUMENTS

| | | | |
|---|---|---|---|
| 6,522,343 B2 * | 2/2003 | Sobeski et al. | 715/744 |
| 6,571,203 B2 * | 5/2003 | Fujieda | 703/6 |
| 2004/0064570 A1 * | 4/2004 | Tock | 709/228 |
| 2004/0205734 A1 * | 10/2004 | Srinivasan et al. | 717/140 |

OTHER PUBLICATIONS

Platform SDK: COM IGlobalInterfaceTable msdn.mircosoft.com/library/en-us/com/cmi_d21_5omd.asp?frame=true Platform SDK Release Nov. 2001 pp. 1-2.*
Platform SDK: COM Platform SDK Release Nov. 2001 pp. 1-2.*
Creating the Global Interface Table, [online], © 2002 Microsoft Corporation, [retrieved on May 29, 2002], ://msdn.microsoft.com/library/en-us/com/aptnthrd_4ew5.asp?frame=true, one page.
Autodesk Streamline—Project Management, [online], © 2002 Autodesk, Inc., [retrieved on May 29, 2002], ://usa.autodesk.com/adsk/item/print/0,,787700-123112,00.html, one page.
Autodesk Streamline—Security with Autodesk Streamline, [online], © 2002 Autodesk, Inc., [retrieved on May 29, 2002], http://usa.autodesk.com/adsk/item/print/0,,787705-123112,00.html, one page.

(Continued)

*Primary Examiner* — Lewis Bullock, Jr.
*Assistant Examiner* — Charles E Anya
(74) *Attorney, Agent, or Firm* — Gates & Cooper LLP

(57) ABSTRACT

A method, apparatus, and article of manufacture provide the ability to enable communication between disconnected applications in a computer system. A bridge object is created in a secondary application. Further, an interface for the bridge object enables communication with the secondary application through the bridge object. The interface for the bridge object is registered in a global interface table (GIT). A cookie is retrieved from the GIT in response to the registration. Such a cookie comprises information for utilizing the interface for the bridge object. The cookie is then stored in an environment variable. The environment variable is accessible to a disconnected application (e.g., ActiveX control) such that the cookie may be retrieved to enable use of the interface.

18 Claims, 5 Drawing Sheets

OTHER PUBLICATIONS

Autodesk—Autodesk Streamline—What's New, [online], © 2002 Autodesk, Inc., [retrieved on May 29, 2002], ://usa.autodesk.com/adsk/item/print/0,,1033787-123112,00.html, pp. 1-2.

Autodesk Streamline—Technology Overview, [online], © 2002 Autodesk, Inc., [retrieved on May 29, 2002], ://usa.autodesk.com/adsk/item/print/0,,787687-123112 00.html, pp. 1-2.

Autodesk Streamline—Data Sharing, [online], © 2002 Autodesk, Inc., [retrieved on May 29, 2002], ://usa.autodesk.com/adsk/item/print/0,,787693-123112 00,html, pp. 1-2.

Global Interface Table: An introduction, [online], [retrieved on May 29, 2002], //www.codeconduct.com/ALT/GIT.asp, pp. 1-5.

IDevResource.com COM channel—COM Singletons—A Dangerous Animal, by Richard Blewett, [online], © 2000 IdevResource.com, [retrieved on May 29, 2002], ://www.idevresource.com/com/library/articles/singletons.asp, pp. 1-9.

IGlobalInterfaceTable, [online], © 2002 Microsoft Corporation, [retrieved on May 29, 2002], ://msdn.microsoft.com/library/en-us/com/cmi_D21_5omd.asp?frame=true, pp. 1-2.

IHTMLWindow2::navigate Method, [online], © 2003 Microsoft Corporation, [retrieved on Jun. 5, 2003], ://msdn.microsoft.com/workshop/browser/mshtml/reference/ifaces/window2/navigate.asp, one page.

HResult Property, Exception.HResult Property, [online] © 2003 Microsoft Corporation, [retrieved on Jun. 11, 2003], ://msdn.microsoft.com/library/en-us/cpref/html/frlrfsystemexceptionclasshresulttopic.a..., one page.

HWnd Property (Window), [online] © 2000 Janus Software, [retrieved on Jun. 11, 2003], ://www.janus-software.com/doc/Phx01355.htm, one page.

HWnd ActiveX, [online], [retrieved on Jun. 11, 2003]://www.jcomsoft.com/hwnd.htm, ], pp. 1-2.

Hwnd, [online], © 2003 Microsoft Corporation, [retrieved on Jun. 11, 2003]://msdn.microsoft.com/library/en-us/vbceide/htm/propts_130.asp?frame=true, one page.

IFRAME Element | iframe Object, [online], © 2003 Microsoft Corporation, [retrieved on Jun. 11, 2003], .//msdn.microsoft.com/workshop/author/dhtml/reference/objects/iframe.asp, pp. 1-2.

IHTMLWindow2 Interface, [online], © 2003 Microsoft Corporation, [retrieved on Jun. 5, 2003], ://msdn.microsoft.com/workshop/browser/mshtml/reference/ifaces/window2/window2,a..., pp. 1-3.

IFRAME—Inline Frame, [online], © 1998-2000 Liam Quinn, [retrieved on Jun. 5, 2003], //www.htmlhelp.com/reference/html40/special/iframe.html, pp. 1-2.

Tech Web: The Business Technology Network, TechEncyclopedia, ActiveX control, [online], © 1981-2003 The Computer Language Company, ://www.techweb.com/encyclopedia/defineterm?term=active+x+control, pp. 1-3.

Processes, Threads, and Apartments, [online], © 2003 Microsoft Corporation, [retrieved on Jun. 12, 2003], ://msdn.microsoft.com/library/en-us/com/htm/aptnthrd_8po3.asp?frame=true, pp. 1-3.

TechWeb: The Business Technology Network, TechEncydopedia, cookie, [online], © 1981-2003 The Computer Language Company, [retrieved on Jun. 12, 2003], ://www.techweb.com/encyclopedia/defineterm?term=cookie, pp. 1-3.

TechWeb: The Business Technology Network, TechEncydopedia, environment variable, [online] © 1981-2003 The Computer Language Company, [retrieved on Jun. 12, 2003], ://www.techweb.com/encyclopedia/defineterm?term=environment+variable, pp. 1-3.

* cited by examiner

COMMUNICATION MECHANISM BETWEEN DISCONNECTED APPLICATIONS IN A WEB BROWSER

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 60/392,348, filed Jun. 28, 2002, by Kenneth Alexander Vadella, J. Daniel Smith, and Dennis M. Mulonas Jr., entitled "COMMUNICATION MECHANISM BETWEEN DISCONNECTED APPLICATIONS IN A WEB BROWSER".

BACKGROUND OF THE INVENTION

1. Field of the Invention

The present invention relates generally to the communication between computer applications, and in particular, to a method, apparatus, and article of manufacture for communicating between disconnected applications in a web browser.

2. Description of the Related Art

Typically, when ACTIVEX™ (hereinafter ActiveX) controls are used within an HTML (hypertext markup language) page, there is a single "controlling" application. For example, the web browser displaying the HTML page may be the application that "controls" the use of an ActiveX control. However, there may be a need for an ActiveX control to communicate with another application (referred to as a second application) to perform tasks. However, the "controlling" application may be completely (and intentionally) disconnected from the second application. Accordingly, what is needed is a mechanism that allows and provides the ability for an ActiveX control within a "controlling" application to communicate with an external second application. The problems in the prior art may be better understood by describing ActiveX controls and prior art applications that utilize ActiveX controls.

ActiveX controls are software modules based on Microsoft's™ Component Object Model (COM) architecture. The COM architecture allows a "controlling" program (such as a web browser) to add functionality by calling a component (i.e., an ActiveX control) that intermingles with and appears as a standard part of the "controlling" program. For example, user interface functions, such as a toolbar, may be added, or a web page may be turned into a software page that can perform similar to other programs launched from a server.

As described above, an ActiveX control may need to communicate with an application other than the control's controlling application. An example of such a desire to communicate exists in the STREAMLINE™ (hereinafter Streamline) product on a PROJECTPOINT™ (hereinafter ProjectPoint) platform, both of which are available from the assignee of the present invention. Streamline is a hosted online collaboration service for the manufacturing industry. Using Streamline, users of an entire design chain may communicate with each other and access digital design information. The Streamline product executes on the ProjectPoint platform (also referred to as the Buzzsaw™ platform). ProjectPoint is a secure, online collaboration and project management service that keeps project teams connected and allows the storage, management, and sharing of project documents from any Internet connection.

ActiveX controls in Streamline (referred to as "client controls") may need to communicate with the ProjectPoint application to perform tasks such as uploading a markup file to the project hosting environment. However, the two applications (i.e., Streamline and ProjectPoint) are intentionally completely disconnected from each other. In this regard, ProjectPoint does not know that the Streamline controls have been created, and the Streamline controls do not know that they are being used within the ProjectPoint environment.

A further problem with the prior art exits if multiple programs are dependent on each other for desired operations. With such dependency, one program may have an ActiveX control that utilizes a service/attribute of a second application. For example, a Streamline client control hosted in a particular environment may be able to save a file (e.g., a markup file) to a server. In this example, the Streamline code that enables such behavior may be specific to the particular environment.

However, if the second application or particular environment is changed, the ActiveX control may not be able to execute properly. Continuing with the example above, if the particular environment is replaced (e.g., with ProjectPoint), the new environment may not allow a readily accessible interface for the desired behaviors (e.g., to save the markup file to the server). Accordingly, the Streamline client controls may not properly execute in a new environment.

To address this gap in functionality, a general purpose mechanism for communication between a project hosting environment (e.g., ProjectPoint) and ActiveX controls (e.g., Streamline client controls) (within an HTML, page) is needed.

SUMMARY OF THE INVENTION

One or more embodiments of the invention enable communication between two disconnected applications (referred to as a secondary application and disconnected/controlling application) (e.g., between a project hosting environment/application and ActiveX controls within a web page). To enable such communication, an object that acts as a bridge between the applications is established/created on/by one application.

The bridge is accessed using an interface or interface object. To enable use of the interface, the bridge object (or the interface for the bridge object) is registered in a global interface table (GIT). The GIT is a process-wide repository of interfaces/interface pointers.

When the interface is registered in the GIT, the GIT returns a cookie that identifies the pointer and location of the interface. However, to enable access to the cookie (and the interface), the cookie must be easily available to a disconnected/controlling application. Accordingly, the cookie is stored in an environment variable.

When the disconnected application desires to communicate with the secondary application, the disconnected application accesses the environment variable to retrieve the cookie. The cookie is then used to retrieve the pointer to the interface. The interface may then be used to communicate with the secondary application through the bridge object.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

To allow disconnected applications (e.g., ActiveX controls and secondary applications) to communicate with each other while still maintaining their independence, one or more embodiments of the invention provide a "Client Host Bridge". The bridge is utilized to provide a disconnected application with access to a secondary application. To utilize the bridge, an interface to the bridge is placed in a Global Interface Table (GIT). A cookie that supports retrieval of the interface is placed in an environment variable for the use and retrieval by the desired application.

Hardware Environment

Figure 1:
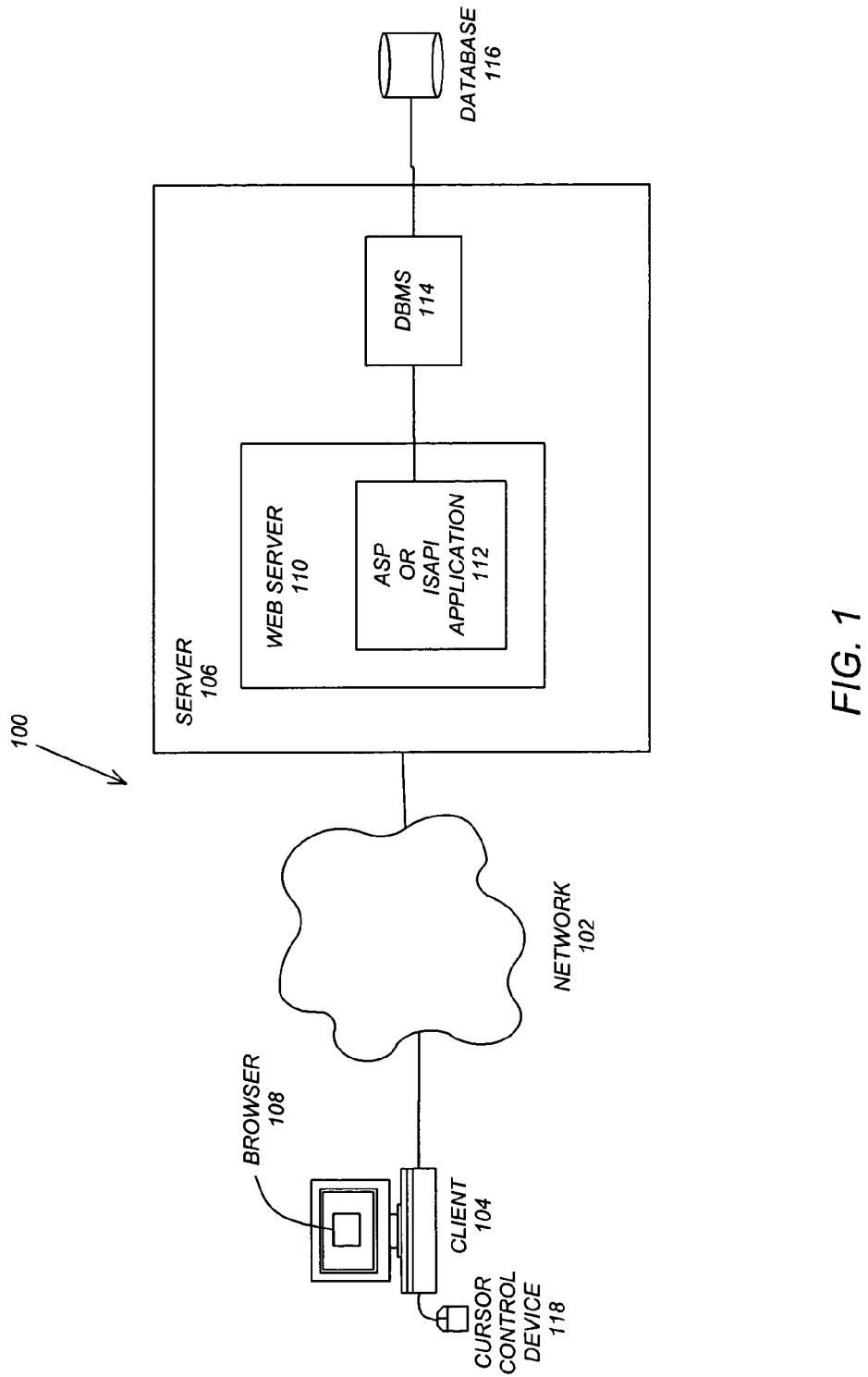
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, LANs (local area networks), WANs (wide area networks), or the like, clients 104 that are personal computers or workstations, and servers 106 that are personal computers, workstations, minicomputers, or mainframes. Additionally, both client 104 and server 106 may receive input (e.g., cursor location input) and display a cursor in response to an input device such as cursor control device 118.

A network 102 such as the Internet connects clients 104 to server computers 106. Clients 104 may execute a client application or Web browser 108 and communicate with server computers 106 executing Web servers 110. Such a Web browser 108 is typically a program such as NETSCAPE NAVIGATOR™ or MICROSOFT INTERNET EXPLORER™. Further, the software executing on clients 104 may be downloaded from server computer 106 to client computers 104 and installed as a plug in or ActiveX control of a Web browser 108. Accordingly, clients 104 may utilize ActiveX components/component object model (COM) or distributed COM (DCOM) components to provide a user interface on a display of client 104. The Web server 110 is typically a program such as Microsoft's Internet Information Server.

Web server 110 may host an Active Server Page (ASP) or Internet Server Application Programming Interface (ISAPI) application 112, which may be executing scripts. The scripts invoke objects that execute business logic (referred to as business objects). The business objects then manipulate data in database 116 through a database management system (DBMS) 114. Alternatively, database 116 may be part of or connected directly to client 104 instead of communicating/obtaining the information from database 116 across network 102. When a developer encapsulates the business functionality into objects, the system may be referred to as a component object model (COM) system. Accordingly, the scripts executing on web server 110 (and/or application 112) invoke COM objects that implement the business logic. Further, server 106 may utilize Microsoft's Transaction Server (MTS) to access required data stored in database 116 via an interface such as ADO (Active Data Objects), OLE DB (Object Linking and Embedding DataBase), or ODBC (Open DataBase Connectivity).

Generally, these components 108-118 all comprise logic and/or data that is embodied in or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Software Embodiments

Figure 2:
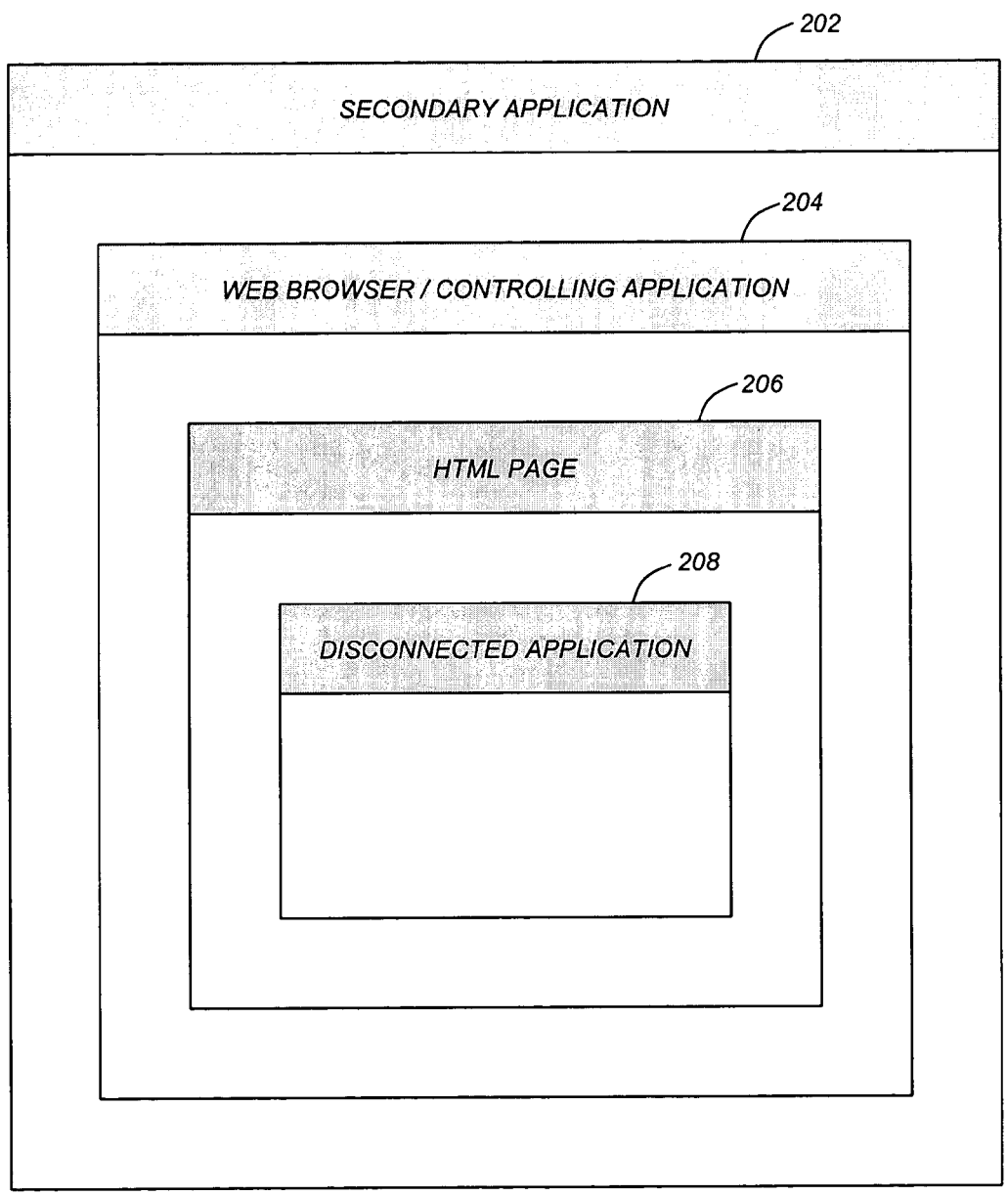
FIG. 2 illustrates a secondary application that has created a web browser control to host an HTML (hyper text markup language) page in accordance with one or more embodiments of the invention.

As described above, a disconnected application (such as an ActiveX control) may desire to communicate with a secondary application (such as a hosting environment) via a COM-based interface or interfaces. For example, FIG. 2 illustrates a secondary application 202 (such as a hosting environment—e.g., ProjectPoint) that has created a web browser (e.g., INTERNET EXPLORER™) control 204 (also referred to as a controlling application 204) to host an HTML (hyper text markup language) page 206. The HTML page 206 provides a disconnected application 208. In this regard, the HTML page 206 may instantiate ActiveX controls (e.g., Streamline client controls) in accordance with one or more embodiments of the invention. In view of FIG. 2, the issue is how to get a COM-based interface from the secondary application 202 to the disconnected application 208. As a side issue, it may be preferable for the disconnected application 208 to be "blissfully ignorant" of the secondary application 202. Such ignorance would provide the ability to host the disconnected application 208 in other (future) environments/applications 202 without the need for substantial additional programming or coding rework. For example, a secondary application 202 may comprise a "stand alone viewer" that hosts the ActiveX controls.

To enable such communication, various user and technical desires may be satisfied. However, such desires may not exist or be satisfied in various embodiments. For example, a user may desire the ability to save markup files (e.g., from an ActiveX control) to the secondary application 202 (e.g., a project hosting environment). Further, a visible representation of the markup files may exist in a graphical user interface of the secondary application 202 (e.g., in a "markup" tab of a ProjectPoint environment). Another desire may relate to status/error messages in the secondary application 202. For example, disconnected applications 208 and/or clients 104 may desire to report errors/status to the secondary application 202. In this regard, the secondary application 202 may handle a display of issues to be resolved.

An example of a technical desire includes providing an application programming interface (API) to ActiveX controls. In this regard, a secondary application 202 may deliver a COM-based interface to ActiveX controls that can be used for communication between the ActiveX controls and the secondary application 202.

Various approaches may be utilized to satisfy such desires and enable communication between disconnected applications 208 and secondary application 202. Detailed descriptions of some of these approaches follow.

Historical (eRoom™) Approach

An example of a particular secondary application 202/project hosting environment that hosts ActiveX controls is EROOM™ (hereinafter eRoom) (an environment available from eRoom Technology, Inc. of Cambridge Mass.). In the eRoom environment, ActiveX controls are able to save a markup file to a server.

Using an eRoom environment, a web page (e.g., HTML page 206) may be created on-the-fly by an eRoom application. In this regard, the eRoom application may instantiate an ActiveX control representing a document (non-visible) such as a web page 206 (such an ActiveX control is referred to as a document control) and one or more ActiveX controls which are views of the document (referred to as view controls). Such document controls and view controls may be embedded in an IFRAME element/object (an HTML element that defines an inline frame for including external objects) of an HTML page 206. The IFRAME element may also comprise an object with appropriate methods and properties. An IFRAME element functions as a document within a document, or like a floating frame.

A URL (as a property) may be provided to the document control by the hosting environment 202 (for later use). The user may then invoke a "save markup" operation. In response, the document control saves a simple markup file (i.e., image with no markup entities) to a local disk.

Thereafter, it is desirable to access and control the documents and markups in a window. Each IFRAME object/element may correspond to an open window in a browser 204. While various functionality/properties may be controlled through the IFRAME object, each particular open window (e.g., a window object) may not be controlled through the IFRAME object. In this regard, an interface may provide access to each window object. Such an interface may be referred to as the IHTML Window2 interface. Since the document control knows that it is embedded in an IFRAME element, the document control uses a method of the IFRAME object to perform a query for the appropriate IHTMLWindow2 interface to control the window.

Once the IHTML Window2 interface is obtained, the document control may call the navigate method (i.e., navigate (URL)) of the interface. The navigate method loads the specified URL to the current window. In this regard, the specified URL may comprise the URL supplied by the hosting environment above. In addition, the name of the saved markup file may be appended to the URL (e.g., "Filename=<localMarkupFile>"). The navigate method invokes a new web page showing a markup view control and the contents of the simple markup file saves described above.

Inside the markup view control, the end-user may redline and markup the document as desired. Also within the markup view control, the end-user may invoke the markup view control's save functionality that uses the same "URL provided to document" methodology described above. The actual markups (in the form of a markup file) may then be physically uploaded to the eRoom hosting environment via an HTTP POST request. On upload, the eRoom hosting environment may create an eRoom ID for the uploaded file. The IFRAME object is then used with a URL to navigate to a page that relates the markup file with the newly created eRoom ID.

Thus, as described above, the eRoom environment may be used to save a markup file (created using an ActiveX control) to a server. However, additional communication between an ActiveX control and the hosting environment may be desirable. Further, in such an approach, knowledge of the implementation details may be required for development purposes.

Alternatives to the above historical approach may exist. In this regard, one or more embodiments of the invention solve the problem of the prior art while isolating developers from implementation details.

Backing Up the Window (HWND) Hierarchy Approach

Figure 3:
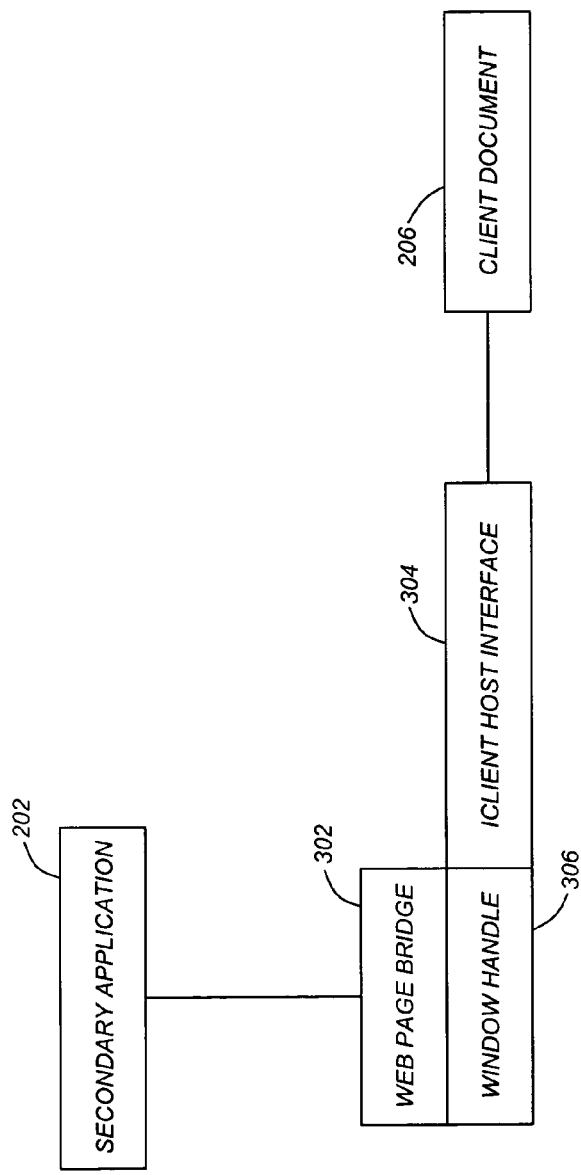
FIG. 3 illustrates an approach where a window hierarchy is examined to find an appropriate window in accordance with one or more embodiments of the invention.

FIG. 3 illustrates an approach where the window hierarchy is examined to find an appropriate window. When a secondary application 202 or hosting environment (such as Project Point) creates the HTML page 206 for hosting disconnected applications 208, the secondary application 202 may also construct a WebPageBridge (WPB) object 302 (e.g., using an <OBJECT> tag).

The WPB object 302 acts as the bridge between an ActiveX control within a document (e.g., the HTML page 206) and the secondary application 202. An interface enables a disconnected application 208 to communicate with the WPB. Accordingly, the secondary application 202 may also create the interface 304 (referred to as the IClientHost Interface) in the document/HTML page 206 (e.g., using an <OBJECT> tag).

When the WPB is instantiated, the WPB "backs up" through its window hierarchy to find the appropriate window (e.g., the WPB obtains the appropriate window handle 306 by examining and traversing through the window hierarchy). A variety of methods may be utilized to find the "correct"/"appropriate" window (e.g., three parents up, a property on the window handle, etc.). Upon finding the appropriate window/window handle 306, communication between the WPB 302 and secondary application 202 may be enabled using various windows application programming interface (API) commands (e.g., via SendMessage ( . . . ) commands). However, communication between the client document/HTML page 206 and the WPB 302 may be performed via the IClientHost interface 304, thereby isolating clients/client documents 206 from the specifics of how communication with the secondary application 202 is accomplished.

Global Interface Table Approach

Figure 4:
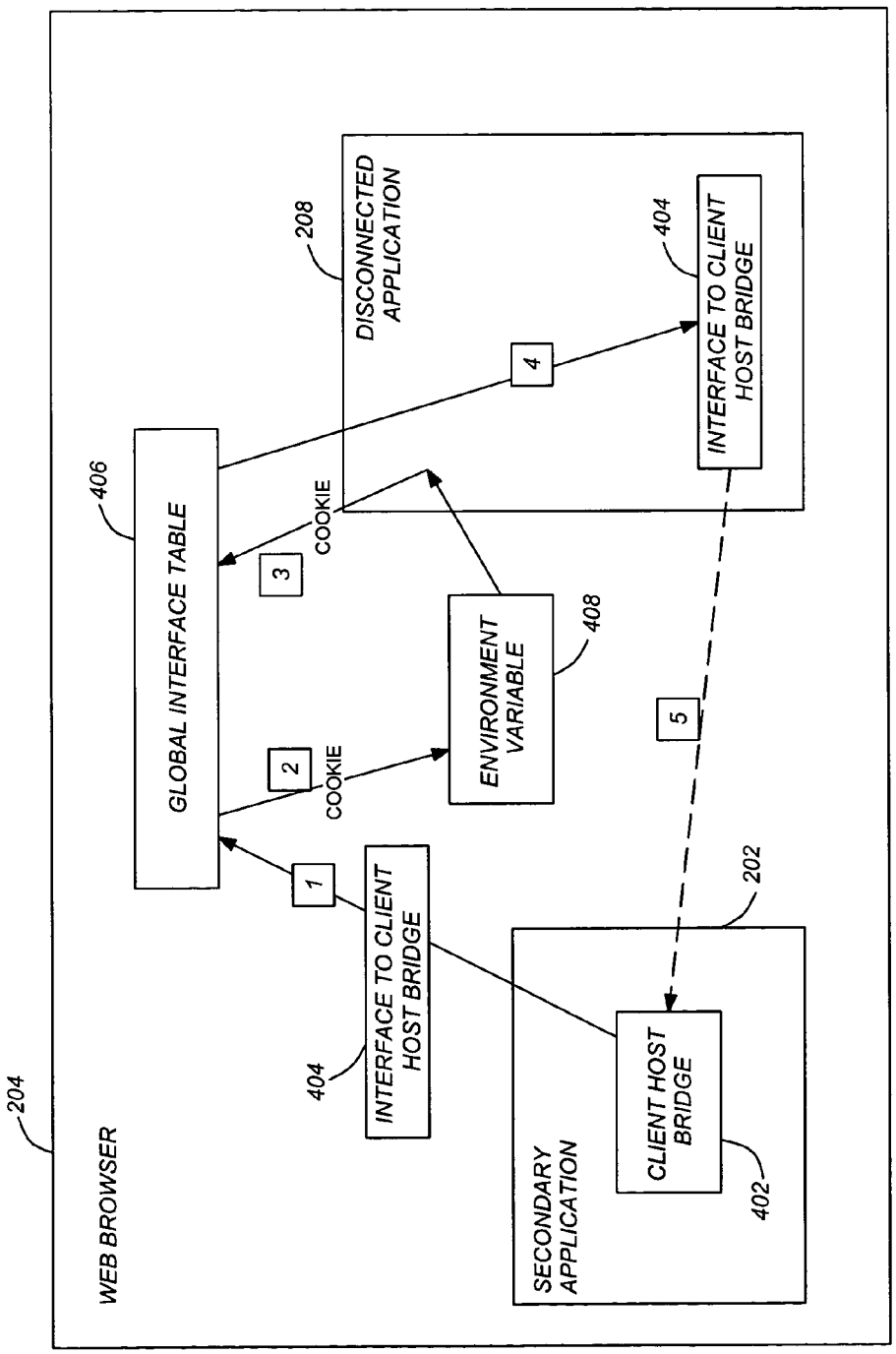
FIG. 4 illustrates the use of a client host bridge to allow disconnected applications to communicate with each other in accordance with one or more embodiments of the invention.

To allow disconnected applications 208 to communicate with each other while still maintaining their independence, one or more embodiments of the invention provide and utilize a "Client Host Bridge" (referred to hereafter as "bridge") as illustrated in FIG. 4. This bridge 402 may be a COM (Component Object Model) object created by a secondary application 202 (such as project hosting environment—e.g., ProjectPoint) during its initialization phase.

The methods and properties of the bridge object 402 are accessed using an interface (referred to as an interface to client host bridge 404). Once the bridge object 402 has been created, the secondary application 202 registers the interface 404 with a Global Interface Table (GIT) 406 by placing a pointer to the interface in the GIT 406.

Globally registered interfaces can be retrieved and used by other software components within the same address space where registration occurs. In this regard, the GIT 406 is a process-wide repository that maintains/stores interface pointers. The GIT 406 can be accessed from multiple apartments (COM objects in a process may be divided into groups referred to as apartments) within a process. As described herein, a process may comprise a collection of virtual memory space, code, data, and/or system resources. Accordingly, the GIT 406 is a repository (accessible across an entire process) that allows an apartment in a process access to an interface implemented on an object in any other apartment in the process.

The secondary application 202 and disconnected applications 208 are executing within the same process but in different apartments. Since they are executing within the same process, the GIT 406 is accessible by both the secondary application 402 and the disconnected applications 208.

The placement of the pointer to the interface 404 for the bridge object 402 in the GIT 406 is indicated as box 1 of FIG. 4. Once the interface 404 is placed in the GIT 406, the GIT 406 returns a "cookie" (box 2) that can be later used to retrieve the interface 404 from the GIT 406. The cookie is data created by the GIT 406 that may identify the interface 404 pointer and its location. The cookie is then placed in an environment variable 408. As used herein, an environment variable 408 is an item of data that is updated by the operating system, web server or other control program. Further, the environment variable 408 resides in memory and can be read by applications. Once the cookie is placed in the environment variable 408, the bridge 402 setup is complete.

When a disconnected application 208 desires to communicate back to the secondary application 202, the disconnected application 208 retrieves the environment variable 408 and extracts the cookie. This cookie is then used to retrieve the pointer to the bridge interface 404 from the GIT 406 (i.e., illustrated as boxes 3 and 4 of FIG. 4). With the pointer, the disconnected application 208 can access and utilize the interface to communicate back to the secondary application 202.

Thus, as described above, prior to creating a web page 206, the secondary application 202 creates a client host bridge 402 and registers an interface for the bridge 402 in the global interface table 406. The resulting cookie is then stored in an environment variable 408. When the web page 206 and/or disconnected application 208 (e.g., containing ActiveX controls) is created, the disconnected application 208 retrieves the cookie from the environment variable 408. The cookie may then be used to obtain, retrieve, or create an interface object 404 that the disconnected application 208 may use to interact with the secondary application 202. Accordingly, the cookie may be retrieved (and used to create the interface 404) at construction time, and may not be passed through the hosting HTML page 206. However, alternative retrieval times may also be within the scope of the present invention.

Additionally, since the interface 404 is used to communicate with the secondary application 202, clients such as the disconnected application 208 (e.g., ActiveX controls) are isolated from the specifics of how communication with the secondary application 202 is accomplished.

Figure 5:
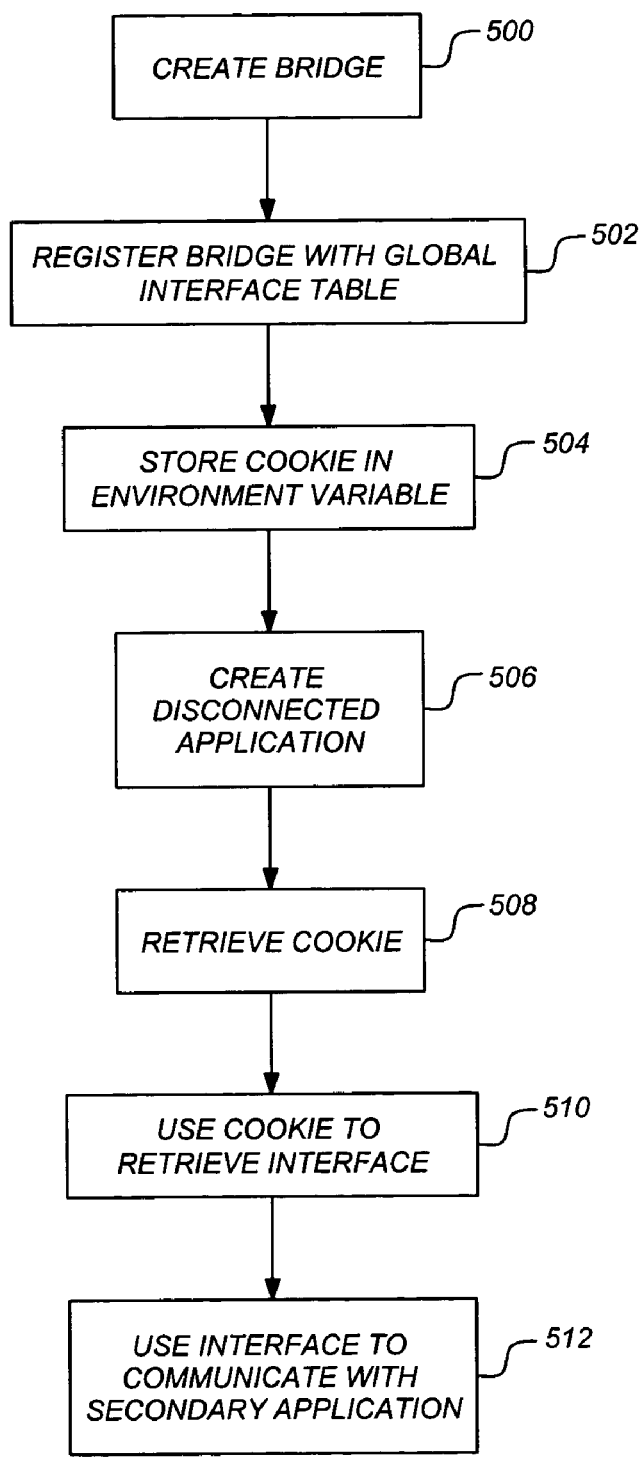
FIG. 5 is a flow chart illustrating the use of a global interface table in accordance with one or more embodiments of the invention.

FIG. 5 is a flow chart illustrating the use of the GIT 406 in accordance with one or more embodiments of the invention.

At step 500, the bridge (or bridge object) 402 is created by the secondary application 202. In this regard, the bridge object 402 and an interface 404 for the bridge object 402 enables communication with the secondary application 202. Further, as described above, the secondary application 202 may be a project hosting environment such as ProjectPoint™.

At step 502, the bridge 402 (or an interface to the bridge) may be registered in the GIT 406. Such a registration may comprise placing a pointer to the location of the interface 404 for the bridge 402 in the GIT 406. In response to the registration, a cookie is returned by the GIT 406. The cookie comprises information for utilizing the interface 404 for the bridge object 402. In this regard, the cookie may identify the pointer and a location of the interface 404. At step 504, the cookie is stored in an environment variable 408. At step 506, a disconnected application 208 (e.g., ActiveX controls) may be created (e.g., within in an HTML page 206).

To facilitate communication between the disconnected application 208 and the secondary application 202, the cookie is retrieved/extracted from the environment variable 408 at step 508. At step 510, the cookie is used to enable use of the interface 404 for the bridge object 402. In this regard, the cookie may be used by the disconnected application 208 to create/retrieve the interface 404 to the bridge 402 (e.g., an interface object 404 is obtained). Once the interface 404 has been obtained, the disconnected application 208 may communicate with the secondary application 202 through the bridge 402 and interface 404 at step 512.

Example Communication Using the Global Interface Table

In accordance with the above description, any type and flow of communication may occur between a disconnected application 208 and the secondary application 202. In this regard, different operations (e.g., performed by an disconnected application 208) may follow different communication flows.

An example of a communication between a disconnected application 208 (e.g., an ActiveX control) and a secondary application 202 is that of saving a markup file. For example, once the cookie has been passed using the environment variable 408, a markup file may need to be saved after a notification is made to the secondary application 202.

To accomplish such a communication, the communication bridge is setup using environment variables 408 as described above. Thereafter, a save markup operation may be initiated from a disconnected application 208 (e.g., an ActiveX control that provides a toolbar for marking up a drawing (referred to as markup control)). To avoid complex communication, the markup control saves the markup file to a temporary location. The markup control then utilizes the environment variable 408 to retrieve the cookie to access the interface to transmit the save markup file message. The markup control may then call the secondary application 202 (through the interface 404 to bridge 402) to save the markup. Such a communication may pass the filename of the temporary file to the secondary application 202. The secondary application 202 may then continue through the normal flow of control for saving files (dialogs, etc.).

In addition to saving the markup, embodiments of the invention may provide for the display of the issue status or error messages to the user. To provide such capabilities, the client host bridge 402 and interface is setup using the environment variables 408 as described above. The interface 404 for the bridge 402 may then allow for sending status/error messages to the secondary application 202. Once received, the secondary application 202 may display the message to the end user as appropriate.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the ability for a secondary application to communicate with a disconnected application in a web browser. Such a secondary application may comprise any type of application including but not limited to a project hosting application/environment. Similarly, a disconnected application may comprise any type of application including but not limited to one or more ActiveX controls.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for enabling communication between disconnected applications, comprising:
   (a) a secondary application creating a web browser control that hosts a web page document within the web browser control, wherein the web page document is configured to instantiate and host a disconnected application control, wherein:
      (i) the disconnected application control is disconnected from the secondary application;
      (ii) the disconnected application control is unaware of the secondary application;
      (iii) the secondary application is unaware of the disconnected application control; and
      (iv) the disconnected application control comprises an ActiveX control;
   (b) the secondary application further creating, when the web page document is instantiated, a bridge object, wherein:
      (i) an interface for the bridge object enables communication from the secondary application to the ActiveX control through the bridge object; and
      (ii) the interface enables communication from the ActiveX control to the secondary application through the bridge object;
   (c) registering the interface for the bridge object in a global interface table (GIT);
   (d) retrieving a cookie from the GIT in response to the registration, wherein:
      (i) the cookie comprises information for utilizing the interface for the bridge object; and
      (ii) utilizing the interface enables the ActiveX control to be isolated from specifics of how communication with the secondary application is accomplished;
   (e) storing the cookie in a location that is accessible to the ActiveX control and to the secondary application such that the cookie may be retrieved to enable use of the interface by the ActiveX control and the secondary application;
   (f) extracting, by the ActiveX control, the cookie from the location;
   (g) accessing, by the ActiveX control, the cookie to enable use of the interface for the bridge object; and
   (h) communicating, by the ActiveX control, with the secondary application using the interface for the bridge object.

2. The method of claim 1, wherein the secondary application comprises a project hosting environment.

3. The method of claim 1, wherein the registering of the interface for the bridge object in the GIT comprises placing a pointer to the interface for the bridge object in the GIT.

4. The method of claim 3, wherein the cookie identifies the pointer and a location of the interface.

5. The method of claim 1, wherein the location comprises an environment variable.

6. The method of claim 1, wherein the secondary application and ActiveX control are executing within a same process but in different apartments.

7. An apparatus for enabling communication between disconnected applications in a computer system comprising:
   (a) the computer system having a memory and a data storage device coupled thereto;
   (b) a secondary application performed by the computer system;
   (c) a web browser control created by the secondary application, wherein the web browser control is configured to host a web page document, wherein:
      (i) the web page document is configured to instantiate and host a disconnected application control, wherein:
      (ii) the disconnected application control is disconnected from the secondary application;
      (iii) the disconnected application control is unaware of the secondary application;
      (iv) the secondary application is unaware of the disconnected application control; and
      (v) the disconnected application control comprises an ActiveX control;
   (d) a bridge object created by the secondary application when the web page document is instantiated, wherein:
      (i) an interface for the bridge object enables communication from the secondary application to the ActiveX control through the bridge object;
      (ii) the interface enables communication from the ActiveX control to the secondary application through the bridge object; and
      (iii) utilizing the interface enables the ActiveX control to be isolated from specifics of how communication with the secondary application is accomplished;
   (e) a global interface table (GIT) configured to:
      (i) accept registration of the interface for the bridge object;
      (ii) return a cookie in response to the registration, wherein the cookie comprises information for utilizing the interface for the bridge object;
   (f) a location configured to store the cookie, wherein the location is accessible to the ActiveX control and the secondary application such that the cookie may be retrieved to enable use of the interface by the ActiveX control and the secondary application; and
   (g) the ActiveX control is configured to:
      (i) extract the cookie from the location;
      (ii) access the cookie to enable use of the interface for the bridge object; and
      (iiI) communicate with the secondary application using the interface for the bridge object.

8. The apparatus of claim 7, wherein the secondary application comprises a project hosting environment.

9. The apparatus of claim 7, wherein the GIT accepts the registration of the interface for the bridge object by storing a pointer to the interface for the bridge object.

10. The apparatus of claim 9, wherein the cookie identifies the pointer and a location of the interface.

11. The apparatus of claim 7, wherein the location comprises an environment variable.

12. The apparatus of claim 7, wherein the secondary application and ActiveX control are executing within a same process but in different apartments.

13. An article of manufacture comprising a non-transitory program storage medium readable by a computer and embodying one or more instructions executable by the computer to perform a method for enabling communication between disconnected applications in a computer system, the method comprising:
  (a) a secondary application creating a web browser control that hosts a web page document within the web browser control, wherein the web page document is configured to instantiate and host a disconnected application control, wherein:
    (i) the disconnected application control is disconnected from the secondary application;
    (ii) the disconnected application control is unaware of the secondary application;
    (iii) the secondary application is unaware of the disconnected application control; and
    (iv) the disconnected application control comprises an ActiveX control;
  (b) the secondary application further creating, when the web page document is instantiated, a bridge object, wherein:
    (i) an interface for the bridge object enables communication from the secondary application to the ActiveX control through the bridge object; and
    (ii) the interface enables communication from the ActiveX control to the secondary application through the bridge object;
  (b) registering the interface for the bridge object in a global interface table (GIT);
  (c) retrieving a cookie from the GIT in response to the registration, wherein:
    (i) the cookie comprises information for utilizing the interface for the bridge object; and
    (ii) utilizing the interface enables the ActiveX control to be isolated from specifics of how communication with the secondary application is accomplished;
  (d) storing the cookie in a location that is accessible to the ActiveX control and to the secondary application such that the cookie may be retrieved to enable use of the interface by the ActiveX control and the secondary application;
  (e) extracting, by the ActiveX control, the cookie from the location;
  (f) accessing, by the ActiveX control, the cookie to enable use of the interface for the bridge object; and
  (g) communicating, by the ActiveX control, with the secondary application using the interface for the bridge object.

14. The article of manufacture of claim 13, wherein the secondary application comprises a project hosting environment.

15. The article of manufacture of claim 13, wherein the registering of the interface for the bridge object in the GIT comprises placing a pointer to the interface for the bridge object in the GIT.

16. The article of manufacture of claim 15, wherein the location comprises an environment variable.

17. The article of manufacture of claim 15, wherein the secondary application and ActiveX control are executing within a same process but in different apartments.

18. The article of manufacture of claim 15, wherein the cookie identifies the pointer and a location of the interface.

* * * * *